3
2,798,075

HETEROCYCLIC QUATERNARY SALTS

Gérald Rey-Bellet and Hans Spiegelberg, Basel, Switzerland, assignors to Hoffmann-La Roche Inc., Nutley, N. J., a corporation of New Jersey No Drawing. Application March 16, 1956,
Serial No. 571,886

Claims priority, application Switzerland March 21, 1955

9 Claims. (Cl. 260—295)

This invention relates to novel chemical compounds. More particularly, it relates to compounds having the formula (I)
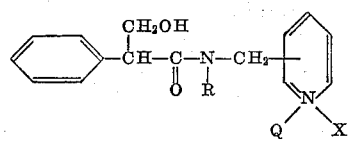

wherein R represents a member selected from the group consisting of hydrogen and lower acyclic hydrocarbon radicals, Q represents a hydrocarbon radical containing not more than eight carbon atoms, and X represents an anion.

Compounds of the above formula can be made by reacting tertiary bases of the formula (II)
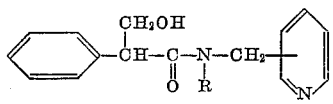

wherein R has the same meaning indicated above, with a quaternizing agent having the formula (III)     Q—X wherein Q and X have the same meaning indicated above.

The tertiary bases of Formula (II) above, used as starting materials in making the novel products of the invention, constitute a known class of compounds. They can be made, for example, by condensing O-acetyltropic acid chloride with α-, β- or γ-picolyl amine (which amine can be substituted at the nitrogen atom by a lower acyclic hydrocarbon radical, if desired); and hydrolyzing off the acetyl group in the resulting condensation product. Illustrative compounds suitable as starting materials in making the novel products of the present invention are those species of Formula (II) wherein R represents, for example, hydrogen; a lower alkyl radical, such as methyl, ethyl, propyl, isopropyl, n-butyl, and the like; a lower alkenyl radical, such as allyl and crotyl; and a lower alkinyl radical, such as propargyl.

The quaternizing agents of Formula (III) above, used as starting materials in making the novel products of the present invention, are likewise well known compounds. It is preferred to use such quaternizing agents wherein the anion X is a pharmaceutically acceptable anion, such as chloride, bromide, iodide, methosulfate and ethosulfate. Illustrative quaternizing agents which can be used in making the novel compounds of the invention are, for example, methyl chloride, methyl bromide, methyl iodide, dimethyl sulfate, diethyl sulfate, benzyl chloride, benzyl bromide, α-phenethyl chloride, β-phenethyl bromide, allyl bromide, and the like. The novel products of the invention can be made by merely mixing the tertiary base of Formula (II) with an approximately molar proportion of the quaternizing agent of Formula (III) at room temperature. The rate of reaction can usually be accelerated by heating the reaction mixture. The addition of an inert solvent or inert diluent to the reaction mixture facilitates mixing and permits better regulation of the reaction temperature.

The novel products of the invention are, in general, readily water-soluble, well crystallized salts. They are useful as therapeutic agents, more particularly, as spasmolytic medicinals; being characterized generally by marked atropine-like activity and relative absence of papaverine-like activity.

The invention is further disclosed in the following examples, which are illustrative but not limitative thereof.

Example 1

27 g. of tropic acid-N-methyl-N-(β-picolyl)-amide was dissolved in 300 ml. of acetone and the solution was mixed with 25 g. of methyl iodide. The reaction mixture was allowed to stand for several hours at 20°–25° C. The crystalline precipitate was filtered off with suction, and then was recrystallized from a mixture of ethanol and diethyl ether. There was thus obtained tropic acid-N-methyl-N-(β-picolyl)-amide iodomethylate in the form of hygroscopic crystals, M. P. 98°–100° C.

Example 2

To a solution of 14.2 g. of tropic acid-N-ethyl-N-(γ-picolyl)-amide in 50 ml. of acetone was added dropwise, while stirring, 6.3 g. of dimethyl sulfate. The reaction mixture was maintained between 10° C. and 15° C. by a cooling bath. After some time a gradual precipitation of crystals occurred. The precipitate was recrystallized from a mixture of ethanol and diethyl ether; tropic acid-N-ethyl-N-(γ-picolyl)-amide methylsulfomethylate being thus obtained as a colorless crystalline powder, M. P. 155°–156° C.

Example 3

8.35 g. of tropic acid-N-allyl-N-(β-picolyl)-amide was dissolved in 50 ml. of acetone, mixed with 3.5 g. of allyl bromide, and the reaction mixturew as permitted to stand for one week at room temperature. Then the acetone was driven off under reduced pressure, and the residue was purified by dissolution in ethanol and precipitation of ethyl acetate. There was thus obtained tropic acid-N-allyl-N-(β-picolyl)-amide bromallylate as a viscous, readily water-soluble oil.

Example 4

28.4 g. of tropic acid-N-ethyl-N-(γ-picolyl)-amide was dissolved in 300 ml. of acetone and the solution was mixed with 25 g. of methyl iodide. The reaction mixture was allowed to stand overnight at 20°–25° C. The precipitate was filtered off with suction, and then was recrystallized from a mixture of ethanol and diethyl ether. There was thus obtained tropic acid-N-ethyl-N-(γ-picolyl)-amide iodomethylate, M. P. 186°–187° C.

Example 5

200 g. of phosphorus pentachloride was mixed portionwise with 138 g. of α-hydroxymethyl-pyridine hydrochloride. When the evolution of hydrogen chloride ceased, the reaction mixture, which has become liquid, was diluted with 300 ml. of chloroform and was refluxed for 30 minutes. Chloroform, and phosphorus oxychloride formed by reaction, were thus distilled off; and the residual solid was recrystallized from 150 ml. of absolute ethanol, yielding α-chloromethyl-pyridine hydrochloride, M. P. 120°–121° C.

A solution of 138 g. of α-chloromethyl-pyridine hydrochloride in 100 ml. of water was cooled to minus 10° C. in an ice salt bath, and to the cooled solution was added dropwise, while stirring, an aqueous solution of methylamine containing 50% by weight $CH_3NH_2$. Stirring was continued for an additional hour at 0° C., and then for an hour longer at 60° C. The reaction mixture was cooled with ice and saturated with potassium hydroxide. Then the reaction mixture was extracted with diethyl ether. The extract was dried over solid potassium hydroxide and distilled, yielding methyl-(α-picolyl)-amine, B. P. 78°–80° C./10 mm. The dihydrochloride melted at 184°–185° C.

To a mixture of 71.9 g. of methyl-(α-picolyl)-amine and 59 g. of dry pyridine in 300 ml. of dry cloroform was added slowly, while stirring and cooling with ice water, the crude acetyltropic acid chloride obtained in conventional manner from 95 g. of tropic acid. At the end of the addition, the reaction mixture was stirred 30 minutes longer at 20° C. Then the chloroform solution was diluted with 300 ml. of diethyl ether and was extracted with 3 N aqueous hydrochloric acid. The congo-acid solution was heated for one hour on the steam bath, thereby hydrolyzing the acetyl group of the reaction product. The reaction mixture was filtered through carbon, and excess concentrated ammonia was added. The oil which separated was taken up in chloroform, and then the chloroform was distilled off. The residue was recrystallized from a mixture of ethanol and diethyl ether, yielding tropic acid-N-methyl-N-(α-picolyl)-amide hydrochloride monohydrate, M. P. 82°–84° C.

The free base, tropic acid-N-methyl-N-(α-picolyl)-amide, obtained upon neutralization of 32.45 g. of the above mentioned hydrochloride monohydrate, was dissolved in 300 ml. of acetone and the solution was mixed with 25 g. of methyl iodide. The reaction mixture was allowed to stand overnight at 20°–25° C. The precipitate was filtered off with suction, and then was recrystallized from a mixture of ethanol and diethyl ether. There was thus obtained tropic acid-N-methyl-N-(α-picolyl)-amide iodomethylate, M. P. 133°–134° C.

*Example 6*

To a mixture of 7.4 g. of α-aminomethyl-pyridine (obtainable, for example, by catalytic reduction of α-cyanopyridine) and 5.5 g. of dry pyridine in 50 ml. of dry chloroform was added slowly, while stirring and cooling with ice water, the acetyltropic acid chloride obtained from 12 g. of tropic acid by conventional procedures. At the end of the addition, the reaction mixture was stirred 30 minutes longer at 22° C. and then was extracted with 3 N aqueous hydrochloric acid. The congo-acid solution was heated for one hour on the steam bath, thereby hydrolyzing the acetyl group from the reaction product. Then the reaction mixture was filtered through carbon and excess concentrated ammonia was added. The oil which separated was taken up in chloroform, the chloroform solution was dried, the chloroform was distilled off, and the residue was recrystallized from a mixture of ethyl acetate and petroleum ether. The tropic acid-N-(α-picolyl)-amide thus obtained melted at 115°–116° C.

4.1 g. of tropic acid-N-(α-picolyl)-amide was dissolved in 50 ml. of acetone, the solution was mixed with 2.1 g. of benzyl chloride, and the reaction mixture was refluxed overnight. The acetone was then driven off and the residual reaction product was recrystallized from a mixture of ethanol and diethyl ether. There was thus obtained tropic acid-N-(α-picolyl)-amide chlorobenzylate as colorless crystals, M. P. 197°–198° C.

*Example 7*

14.2 g. of tropic acid-N-ethyl-N-(γ-picolyl)-amide was dissolved in 50 ml. of acetone and the solution was saturated with methyl bromide at 10°–15° C. The reaction mixture was allowed to remain overnight in the refrigerator and then the precipitated salt was filtered off with suction, washed with acetone, dried, and recrystallized from a mixture of ethanol and diethyl ether. The product thus obtained, tropic acid-N-ethyl-N-(γ-picolyl)-amide bromomethylate, melted at 170°–171° C.

By proceeding in the manner taught above, there were obtained the following compounds:

(a) Tropic acid-N-(n-butyl)-N-(α-picolyl)-amide iodomethylate, M. P. 125°–126° C.; from tropic acid-N-(n-butyl)-N-(α-picolyl)-amide and methyl iodide;

(b) Tropic acid-N-(n-propyl)-N-(β-picolyl-amide iodomethylate, as an oil; from tropic acid-N-(n-propyl)-N-(β-picolyl)-amide and methyl iodide;

(c) Tropic acid-N-methyl-N-(β-picolyl)-amide bromomethylate, M. P. 131°–132° C.; from tropic acid-N-methyl-N-(β-picolyl)-amide and methyl bromide;

(d) Tropic acid-N-ethyl-N-(γ-picolyl)-amide bromo-n-butylate, as an oil; from tropic acid-N-ethyl-N-(γ-picolyl)-amide and n-butyl bromide;

(e) Tropic acid-N-(γ-picolyl)-amide iodomethylate, M. P. 108°–109° C.; from tropic acid-N-(γ-picolyl)-amide and methyl iodide;

(f) Tropic acid-N-isopropyl-N-(γ-picolyl)-amide iodomethylate, M. P. 158°–159° C.; from tropic acid-N-isopropyl-N-(γ-picolyl)-amide and methyl iodide;

(g) Tropic acid - N - ethyl - N - (α - picolyl) - amide iodomethylate, M. P. 110°–111° C.; from tropic acid-N-ethyl-N-(α-picolyl)-amide and methyl iodide;

(h) Tropic acid - N - methyl - N - (β - picolyl) - amide iodoethylate, M. P. 140°–141° C.; from tropic acid-N-methyl-N-(β-picolyl)-amide and ethyl iodide.

We claim:

1. A compound having the formula

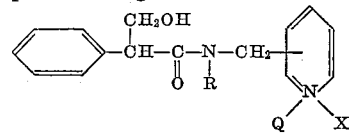

wherein R represents a member selected from the group consisting of hydrogen and lower acyclic hydrocarbon radicals, Q represents a hydrocarbon radical containing not more than eight carbon atoms, and X represents a pharmaceutically acceptable anion.

2. A lower alkyl halide quaternary salt of tropic acid N-lower alkyl-N-picolyl-amide.

3. A lower alkyl-alkyl-sulfate quaternary salt of tropic acid-N-lower alkyl-N-picolyl-amide.

4. Tropic acid-N-lower alkyl-N-(β-picolyl)-amide halogenomethylate.

5. Tropic acid - N - methyl-N-(β-picolyl)-amide iodomethylate.

6. Tropic acid-N-methyl-N-(β-picolyl)-amide bromomethylate.

7. Tropic acid - N - ethyl-N-(γ-picolyl)-amide methylsulfomethylate.

8. Tropic acid-N-ethyl - N - (γ-picolyl)-amide bromomethylate.

9. Tropic acid-N-methyl - N - (α-picolyl)-amide iodomethylate.

References Cited in the file of this patent

UNITED STATES PATENTS

| | | |
|---|---|---|
| 2,572,579 | Urban | Oct. 23, 1951 |
| 2,647,904 | Rey-Bellet | Aug. 4, 1953 |
| 2,677,689 | Rey-Bellet | May 4, 1954 |
| 2,726,245 | Rey-Bellet | Dec. 6, 1955 |